Figures 3, 4:
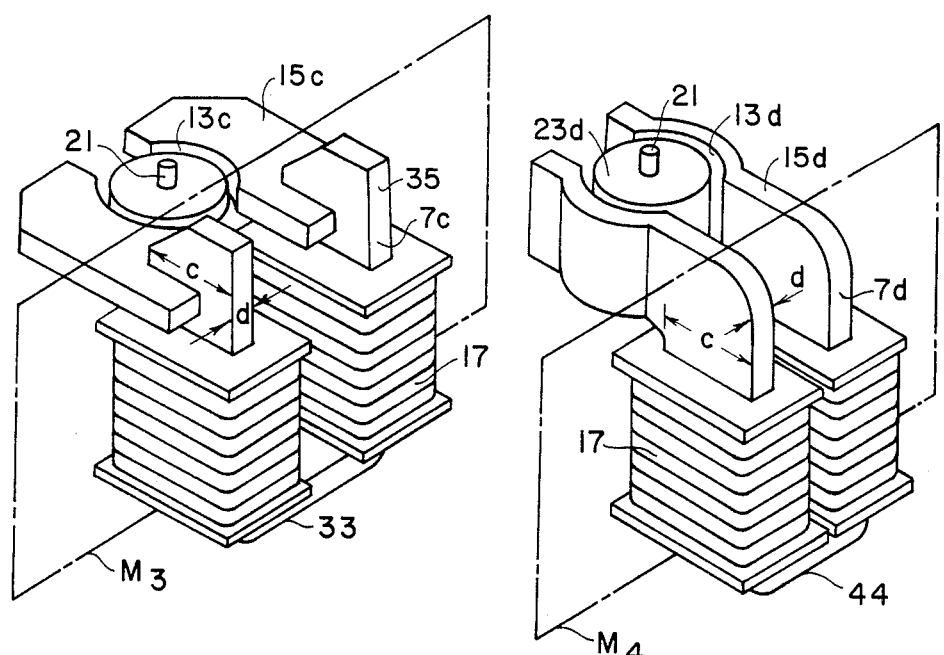

United States Patent [19]

Bertram et al.

[11] Patent Number: 4,554,471
[45] Date of Patent: Nov. 19, 1985

[54] ELECTRIC MOTOR HAVING A U-SHAPED STATOR IRON

[75] Inventors: Leo Bertram, Stolberg, Fed. Rep. of Germany; Hugo Schemmann, Schaesberg; Jan de Boer, Drachten, both of Netherlands

[73] Assignee: U.S. Philips Corporation, New York, N.Y.

[21] Appl. No.: 710,940

[22] Filed: Mar. 13, 1985

Related U.S. Application Data

[63] Continuation of Ser. No. 571,284, Jan. 16, 1984.

[30] Foreign Application Priority Data

Jan. 17, 1983 [DE] Fed. Rep. of Germany ....... 3301263

[51] Int. Cl.⁴ ............................................. H02K 31/00
[52] U.S. Cl. .................................. 310/49 R; 310/216; 310/254
[58] Field of Search ................ 310/49 R, 216, 217, 310/218, 254, 42

[56] References Cited

U.S. PATENT DOCUMENTS

| 2,546,729 | 3/1951 | de Millar | 310/49 R |
| 2,792,510 | 5/1957 | de Wolf | 310/163 |
| 3,375,384 | 3/1968 | Thees | 310/162 |
| 3,739,206 | 6/1973 | Schwarzmuller-Joch et al. | 310/49 |

Primary Examiner—Peter S. Wong
Assistant Examiner—D. L. Rebsch
Attorney, Agent, or Firm—Robert S. Smith

[57] ABSTRACT

The invention relates to an electric motor having a U-shaped stator iron such as a series-, split-pole- or single-phase synchronous motor. Between the free shank ends of the stator, pole shoes are formed, and on the shanks, induction coils are provided. The shanks of the stator iron in the area between the pole shoes and the coils are bent with respect to the central plane of the stator iron in such manner that the shaft of the rotor with the central plane of the stator iron encloses an angle differing from the perpendicular to the central plane.

24 Claims, 6 Drawing Figures

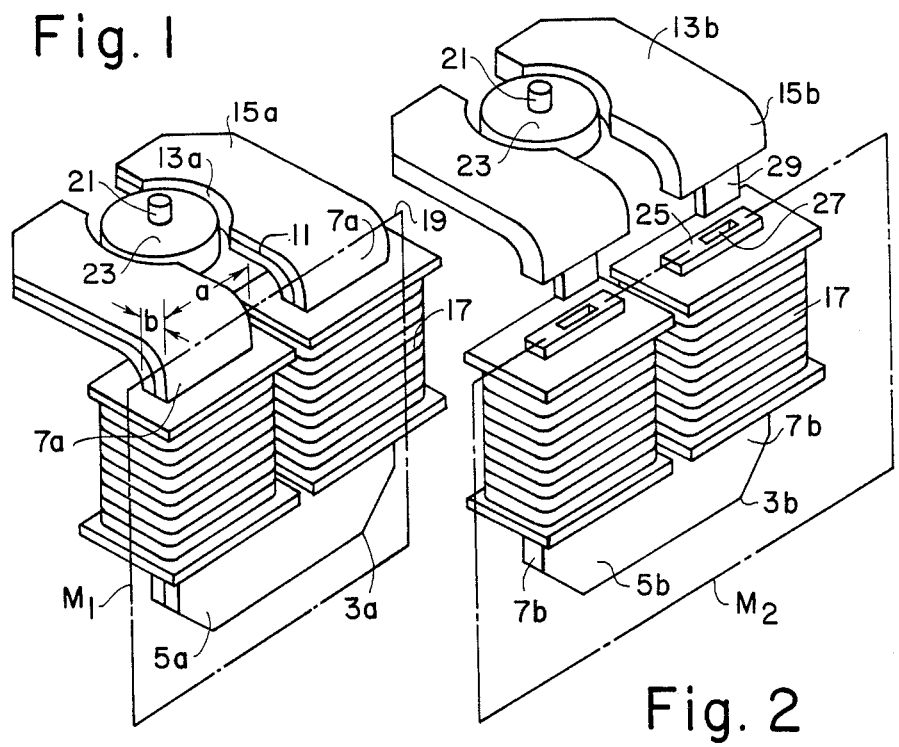
Fig. 1
Fig. 2
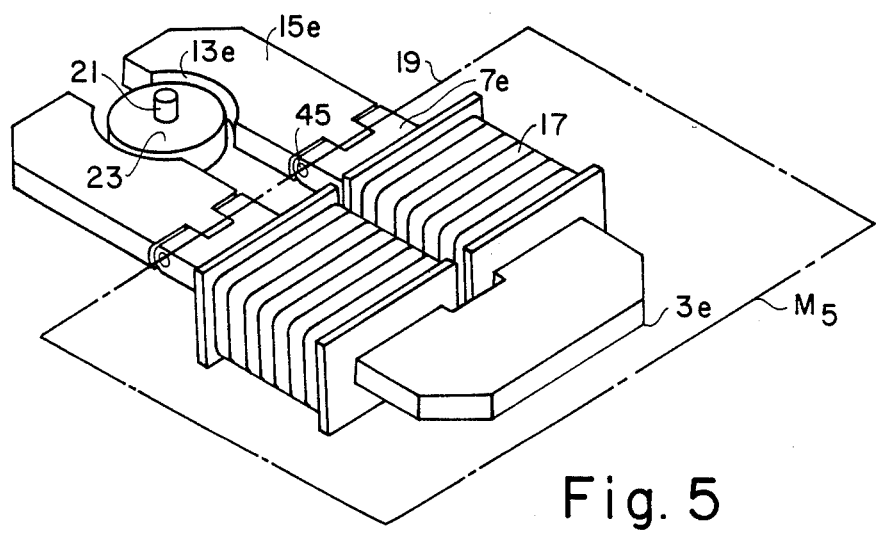
Fig. 5

ELECTRIC MOTOR HAVING A U-SHAPED STATOR IRON

This is a continuation of application Ser. No. 571,284, filed Jan. 16, 1984.

The invention relates to an electric motor such as a series-, split-pole- or single-phase synchronous motor having a rotor with a shaft and a U-shaped stator iron with two free-ended shanks. Pole shoes are formed on the free shank ends and induction coils are provided on the shanks.

Electric motors of this type are generally known as series-, split-pole- and single-phase synchronous motors. They are used in small electric apparatus, for example in citrus fruit squeezers, can openers, etc.

A two-phase synchronous motor has already been suggested in the NL-Patent Application No. 82 00 070. In the known synchronous motor a further shank which supports a pole-shoe which is shifted in phase through 90° is provided between the two outer shanks of the stator iron. This synchronous motor can also be constructed so as to have small dimensions.

In the known electric motors the rotor shaft extends at right angles to the central plane of the stator iron. When the direction of mechanical power transmission does not extend at right angles to the central plane of the stator iron, intermediate gears are necessary to enable a shift of the extended driving shaft.

The small dimensions of motors such as single-phase synchronous motors provide adaption possibilities to meet dimensional requirements. As a result new apparatus are possible that are not possible with the usual motors, for example, split-pole motors.

It is the object of the invention to provide an electric motor of the type mentioned in the opening paragraph, in which the rotor shaft can enclose an angle with the perpendicular to the central plane of the stator iron.

According to the invention, this object is achieved in that the shanks in the area between the pole shoes and the coils are bent with respect to the central plane of the stator iron in such manner that the axis of the rotor encloses an angle with the central plane of the stator iron which differs from the perpendicular to said central plane.

As a result of the bending of the iron shanks, the rotor shaft can extend substantially in any direction in a plane at right angles to the central plane of the stator iron and can hence be adapted to the desired driving problems and driving requirements, respectively. In this manner, there is no need of additional gears, which on the one hand are expensive and on the other hand occupy a large space.

According to a further embodiment of the invention a hinge may be provided in the central plane of the stator iron, as a result of which swinging is feasible during operation.

According to a further embodiment of the invention the bent shank parts are attached to shank stubs projecting from the coils. As a result of this, the subsequent bending of the iron shanks becomes superfluous.

According to a further embodiment of the invention the stator iron is flattened. Said flattening may be in the central plane or at right angles thereto.

According to a further embodiment of the invention an expansion of the shanks of the stator iron in the central plane in the order of magnitude of a factor between 7 and 15 units, is set off by an expansion in the order of magnitude of 1 to 7 units at right angles thereto. On the other hand it is also possible that an expansion of the shanks of the stator iron at right angles to the central plane in the order of magnitude between 7 and 15 units is set off by an expansion in the central plane in the order of magnitude of 1 to 7 units.

According to a further embodiment of the invention it is to be preferred that the larger expansion of the shanks of the stator iron in the order of magnitude of 12 units is set off by a smaller iron expansion at right angles in the order of magnitude of 5 units. In this manner an electric motor can be more considerably flattened and be adapted to wishes as regards design.

According to a further embodiment of the invention it is ensured that the thickness of the laminations of the stator iron is between 0.5 and 5.0 mm and is preferably 1.0 mm.

Finally, according to a further embodiment of the invention, it is ensured that the stator iron consists of 1 to 7, preferably 5 laminated sheets. Fewer sheets in the pack facilitate the bending of the shanks between the pole shoes and the coils after providing the coils.

The invention will now be described in greater detail with reference to the embodiments shown in the drawings, in which FIG. 1 shows a single-phase synchronous motor having bent stator shanks supporting the pole shoes, FIG. 2 shows the motor of FIG. 1 with insertable shanks supporting the pole shoes, FIG. 3 shows a modified embodiment of FIG. 2 with inserted parts of the shanks supporting the pole shoes, the flattening of the stator iron being at right angles to the flattening of the embodiments of FIGS. 1 and 2, FIG. 4 shows an embodiment with flattened stator iron and bent parts of the shanks supporting the pole shoes, the stator iron being flattened at right angles to the flattening of the embodiments of FIGS. 1 and 2, FIG. 5 shows an embodiment having a flattening of the stator iron in accordance with FIGS. 1 and 2, in which hinges are provided in the bending axes of the shanks of the stator iron supporting the pole shoes.

Figure 6:
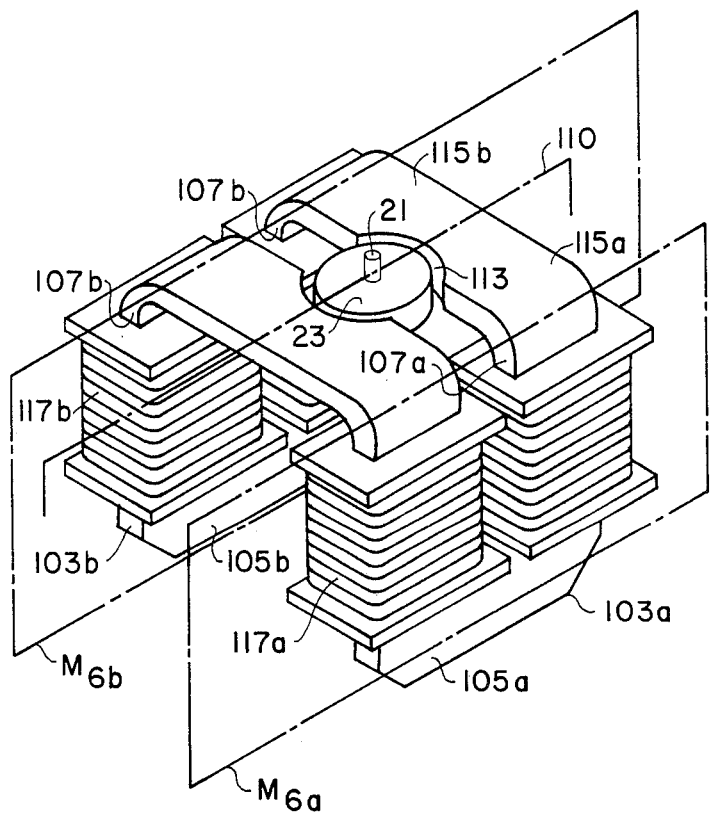

FIG. 6 shows a doubling of the motor of FIG. 1.

FIG. 1 shows the simplest embodiment of the synchronous motor with bent shanks. The stator iron 3a is bent in the form of a U with a yoke 5a and shanks 7a. The stator iron 3a is generally planar and has opposed flat sides on both the yoke 5a and shanks 7a. A central plane M extends through the stator iron. The mid plane $M_1$ is midway between the opposed flat sides of the stator iron 3a and is parallel to the opposed flat sides. Stated another way, the central plane $M_1$ bisects the yoke 3a and the shanks 7a. In the central plane $M_1$ the iron has an expansion or width dimension a in the order of magnitude between seven and fifteen units, preferably twelve units, and at right angles thereto an expansion or thickness dimension b in the order of magnitude from one to seven units, preferably five units. The U-shaped stator iron 3a consists of one to seven, preferably five, laminated iron sheets 11.

In the manufacture of the motor the sheets 11 are first stacked. The elongated parts 15a of the shanks 7a supporting the pole shoes 13a extend in the central plane $M_1$. The coils 17 are then slid on the shanks; the shanks are then bent about a bending axis 19. In the embodiment shown the bending is 90°. However, any other angular position differing from 0° is possible. The rotor shaft 21 of the permanent magnetic rotor 23 in the FIG. 1 embodiment extends parallel to the central plane $M_1$.

The number of iron sheets 11 of the stator iron depends on the flux ratios in the stator. Only the iron saturation is to be considered. However, for the subsequent bending of the shank parts 15a it is favorable to use as few sheets as possible. Moreover, the stacking of fewer sheets is less expensive. Thick sheets are more difficult to bend than thinner sheets. It should be endeavored for an economic manufacture, to try to obtain an optimum of the dimensions. It has proved advantageous when the sheets have a thickness between 0.5 and 5.0 mm, and preferably are 1.0 mm thick.

In the FIG. 2 embodiment, the stator iron 3b is divided, namely into a U-shaped base part having a yoke 5a and shanks 7b. Shank studs 25 having recesses 27 in which pegs 29 of shank parts 15b can be inserted project from the coils 17. After the coils 17 have been provided the shank parts 15b having the pole shoes 13b are placed on the shank stubs 25. In this embodiment the shank parts 15b are preferably formed from unlaminated solid iron. For the proportioning of the expansions or dimensions in the direction of the central plane $M_2$ the relationships which are given with reference to the FIG. 1 embodiment also apply to the FIG. 2 embodiment. Thus, the location of the central plane $M_2$ is the same as that in the FIG. 1 embodiment.

The FIG. 3 embodiment shows a U-shaped stator iron 33 which in contrast with the FIGS. 1 and 2 embodiments has its larger width expansion c at right angles to the central plane $M_3$. Longer shanks 35 of the shanks 7c project from the coils placed on the stator iron 33 than in the FIG. 2 embodiment. Shank parts 15c supporting the pole shoes 13c are slid on said longer shanks 35. As in the embodiments of FIGS. 1 and 2, the rotor shaft 21 extends again in a plane parallel to the central plane $M_3$. The proportioning of the expansions corresponds to those of FIG. 1. The central plane $M_3$ as in the other embodiments bisects the yoke of the stator iron 33 as well as the shank 7c.

In the FIG. 4 embodiment the larger expansion c of the stator iron again extends at right angles to the central plane $M_4$. Accordingly the shorter expansion d extends in the direction of the central plane $M_4$. The shank parts 15d of the shanks 7d of the stator iron 44 supporting the stator poles 13d are in this case bent at right angles to the central plane $M_4$ and enclose the rotor 23d with their wide sides. The proportioning of the expansions corresponds to the proportioning of the FIG. 1 embodiment. The central plane $M_4$, as in the other embodiments, bisects the yoke of the stator iron 44 as well as the shanks thereof.

The construction of the FIG. 5 embodiment is similar to that of FIG. 1. The U-shaped stator iron 3e situated in the plane $M_5$ comprises shanks 7e to which, via hinges 45, the shank parts 15e of the shanks 7e supporting the pole shoes 13e are hinged. With the shank parts 15e longitudinally directed, the coils 17 are slid on the shanks 7e; it is then possible to swing the parts 15e of the shanks in a desired direction. The proportioning of the expansion corresponds to those of FIG. 1.

In the embodiment shown in FIG. 6 the stator iron, as compared with the stator iron shown in FIG. 1, is doubled to form a plane 110 extending through the rotor shaft 21 namely via the pole shoes 113. When the shanks are bent through 90°, the stator irons 103a and 103b and the associated yokes 105a and 105b with their shanks 107a, 107b and their excitation coils 117a and 117b are then situated in the parallel central planes $M_{6a}$ and $M_{6b}$. The pole shoes 113 are supported in common by the bent shank parts 115a and 115b. The further dimensions correspond again to those of FIG. 1.

In the drawing the central planes $M_{6a}$ and $M_{6b}$, after bending the shanks through 90°, extend parallel to each other. The angular position of the central planes, however, can be adapted to technical requirements or design wishes. The central planes $M_{6a}$ and $M_{6b}$ of the stator iron parts 103a and 103b can consequently enclose different angles with the perpendicular to the rotor shaft as may be desired. Each central plane $M_{6a}$ and $M_{6b}$ bisects the yoke and shanks with which it is associated.

What is claimed is:

1. An electric motor which comprises a rotor having a shaft and a U-shaped stator having two shanks, each shank having a free end, said motor also including induction coils disposed around each of said shanks, each of said shanks being formed to define pole shoes between the free ends of each of said shanks and said induction coil disposed on that shank, said U-shaped stator having the major portion thereof configured so that an imaginary central plane extends through all of said stator except the free ends of said shanks, each of said shanks in the area between said pole shoes and said coils being bent with respect to said central plane in such a manner that said shaft encloses with said central plane an angle which is less than 90°.

2. An electric motor as claimed in claim 1, characterized in that a hinge is provided in each of said shank and in said central plane of said stator.

3. An electric motor as claimed in claim 1, wherein said shanks each include projections for cooperation with recesses in axially adjacent portions of respective shanks.

4. An electric motor as claimed in claim 1, wherein said shanks have dimensions parallel to said central plane which is much larger than a dimension at right angles to said central plane.

5. An electric motor as claimed in claim 3, wherein said shanks have a larger dimension perpendicular to said central plane than in the direction parallel to said central plane.

6. An electric motor as claimed in claim 4, wherein the dimension of said shanks parallel to said central plane is in the order of between 7 and 15 units and the dimension of said shanks perpendicular to said central plane is in the order of magnitude of 1 to 7 units.

7. An electric motor as claimed in claim 4, wherein the dimension of said shanks perpendicular to said central plane is in the order of between 7 and 15 units and the dimension of said shanks parallel to said central plane is in the order of magnitude of 1 to 7 units.

8. An electric motor as claimed in claim 6, wherein the dimension of each of said shanks parallel to said central plane is in the order of magnitude of 12 units and the dimension of said shanks perpendicular to said central plane is in the order of magnitude of 5 units.

9. An electric motor as claimed in claim 1 wherein the thickness of said shanks is between 0.5 and 5.0 mm and preferably is 1.0 mm.

10. An electric motor as claimed in claim 1 wherein said stator iron consists of 1 to 7 laminated sheets.

11. An electric motor as claimed in claim 1 wherein said electric motor is a single-phase synchronous motor having a two-pole permanent magnetic rotor.

12. An electric motor as claimed in claim 1 wherein each of said shanks has a second axially spaced induction coil mounted thereon.

13. An electric motor which comprises a rotor having a shaft and a U-shaped stator having two shanks, each shank having a free end, said motor also including induction coils disposed around each of said shanks, each of said shanks being formed to define pole shoes between the free ends of each of said shanks and said induction coil disposed on that shank, said U-shaped stator having the major portion thereof configured so that an imaginary central plane extends through all of said stator except the free ends of said shanks, each of said shanks in the area between said pole shoes and said coils being bent with respect to said central plane in such a manner that said shaft encloses with said central plane an angle which is more than 90°.

14. An electric motor as claimed in claim 13, characterized in that a hinge is provided in each of said shank and in said central plane of said stator.

15. An electric motor as claimed in claim 13, wherein said shanks each include projections for cooperation with recesses in axially adjacent portions of respective shanks.

16. An electric motor as claimed in claim 13, wherein said shanks have dimensions parallel to said central plane which is much larger than a dimension at right angles to said central plane.

17. An electric motor as claimed in claim 15, wherein said shanks have a larger dimension perpendicular to said central plane than in the direction parallel to said central plane.

18. An electric motor as claimed in claim 16, wherein the dimension of said shanks parallel to said central plane is in the order of between 7 and 15 units and the dimension of said shanks perpendicular to said central plane is in the order of magnitude of 1 to 7 units.

19. An electric motor as claimed in claim 16, wherein the dimension of said shanks perpendicular to said central plane is in the order of between 7 and 15 units and the dimension of said shanks parallel to said central plane is in the order of magnitude of 1 to 7 units.

20. An electric motor as claimed in claim 18, wherein the dimension of each of said shanks parallel to said central plane is in the order of magnitude of 12 units and the dimension of said shanks perpendicular to said central plane is in the order of magnitude of 5 units.

21. An electric motor as claimed in claim 16 wherein the thickness of said shanks is between 0.5 and 5.0 mm and preferably is 1.0 mm.

22. An electric motor as claimed in claim 16 wherein said stator iron consists of 1 to 7 laminated sheets.

23. An electric motor as claimed in claim 16 wherein said electric motor is a single-phase synchronous motor having a two-pole permanent magnetic rotor.

24. An electric motor as claimed in claim 16 wherein each of said shanks has a second axially spaced induction coil mounted thereon.

* * * * *